United States Patent

Schurr

[11] Patent Number: 5,083,726
[45] Date of Patent: * Jan. 28, 1992

[54] SEAT TRACK BEARING FOR AN AIRPLANE

[75] Inventor: Daniel M. Schurr, Seal Beach, Calif.

[73] Assignee: Sabre Industries, Inc., Burbank, Calif.

[*] Notice: The portion of the term of this patent subsequent to Jan. 10, 2006 has been disclaimed.

[21] Appl. No.: 349,657

[22] Filed: May 10, 1989

[51] Int. Cl.[5] .................................................. B64D 11/06
[52] U.S. Cl. ............................. 244/118.6; 244/122 R; 248/503.1; 410/104; 410/105
[58] Field of Search ............... 410/101, 102, 104, 105, 410/115; 248/503, 503.1; 244/122 R, 122 AH, 118.6, 118.1

[56] References Cited

U.S. PATENT DOCUMENTS

| | | | |
|---|---|---|---|
| 4,026,218 | 5/1977 | Prete, Jr. et al. | 410/104 |
| 4,230,432 | 10/1980 | Howell | 410/105 |
| 4,376,522 | 3/1983 | Banks | 244/118.6 |
| 4,708,549 | 11/1987 | Jensen | 410/105 |
| 4,776,533 | 10/1988 | Sheek et al. | 244/118.6 |
| 4,796,837 | 1/1989 | Dowd | 244/122 R |

Primary Examiner—Galen Barefoot
Assistant Examiner—Christopher P. Ellis
Attorney, Agent, or Firm—Plante, Strauss, Vanderburghand & Connors

[57] ABSTRACT

Disclosed is a track fitting for an airplane seat leg which has a unitary bearing section and wall element that carries the pin holding the seat leg in position. The bearing section comprises an opening defined by two truncated conical walls with the abutting truncated sections providing a bearing site. The open ends of the opening are surrounded by segmented spherical bearing surfaces which carry caps having conforming internal, spherical bearing surfaces. The pin passes through the assembly of caps and bearing section to secure the leg in position. A plastic, box-like anti-rattle device to prevent rattling is mounted to the rear of the track fitting and bears against the top of a track receiving the fitting.

3 Claims, 3 Drawing Sheets

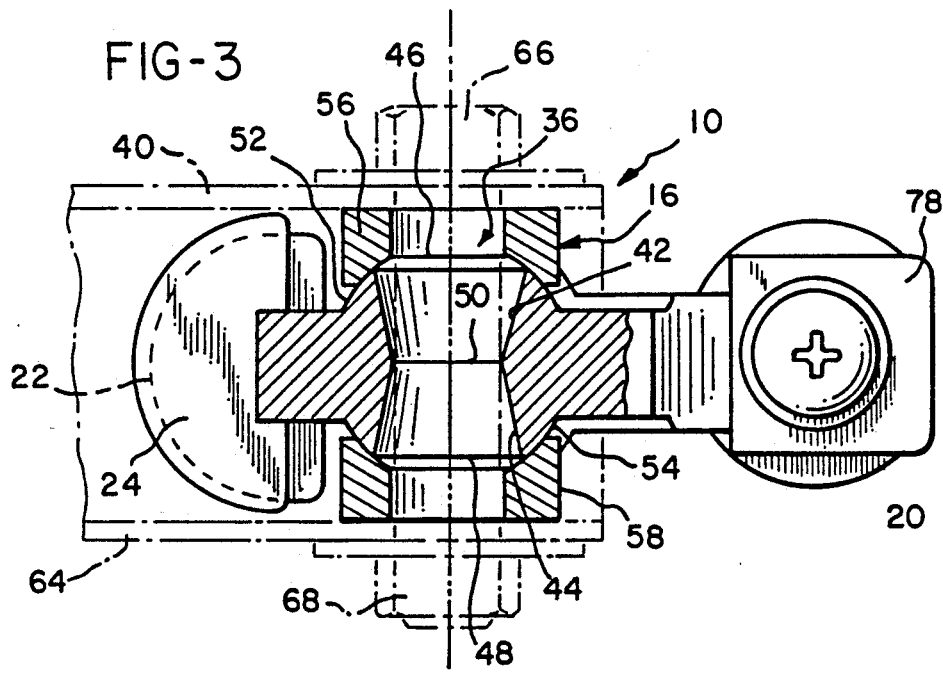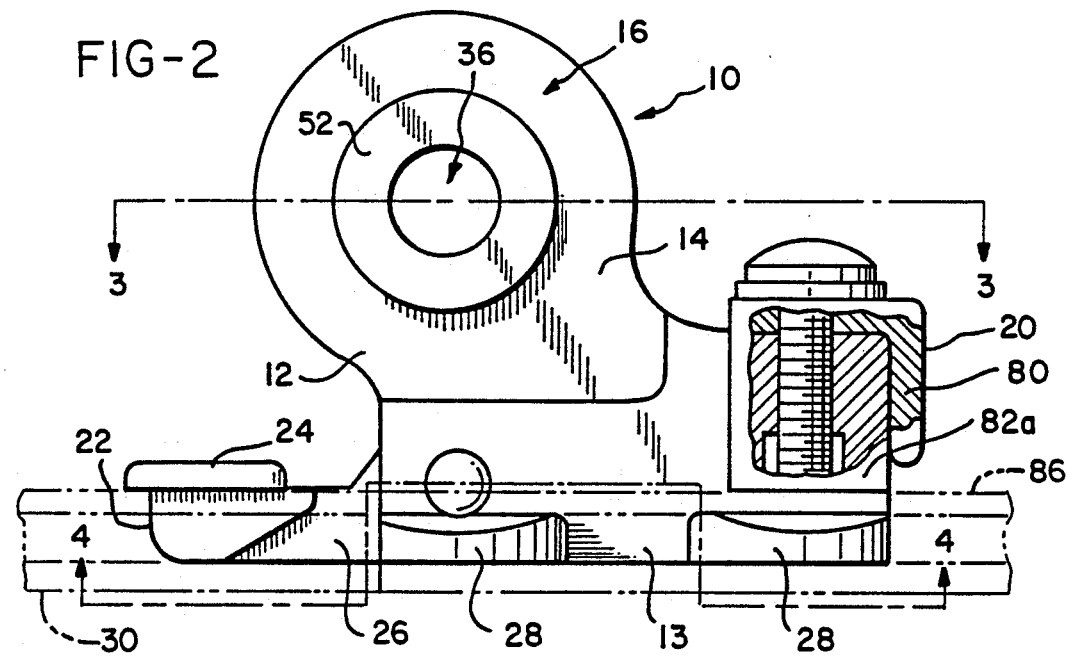

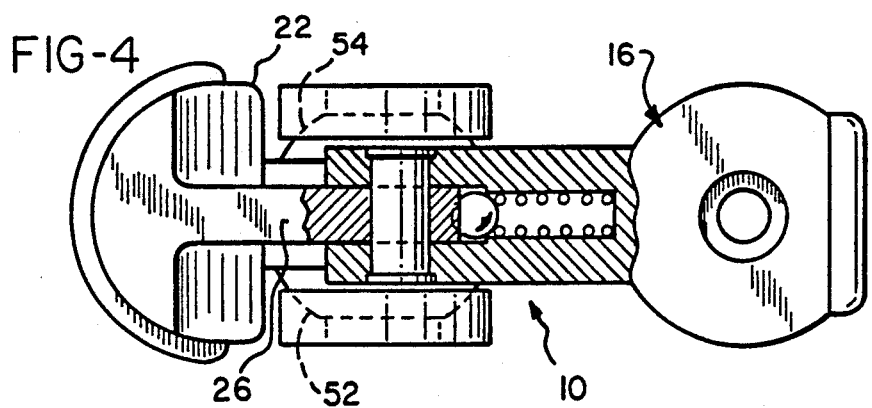
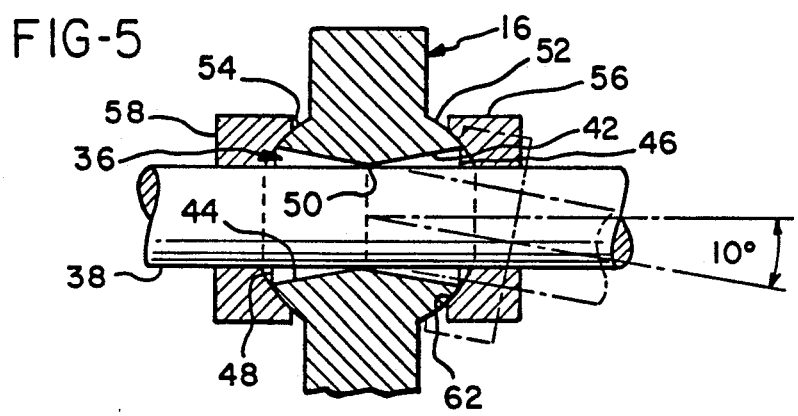
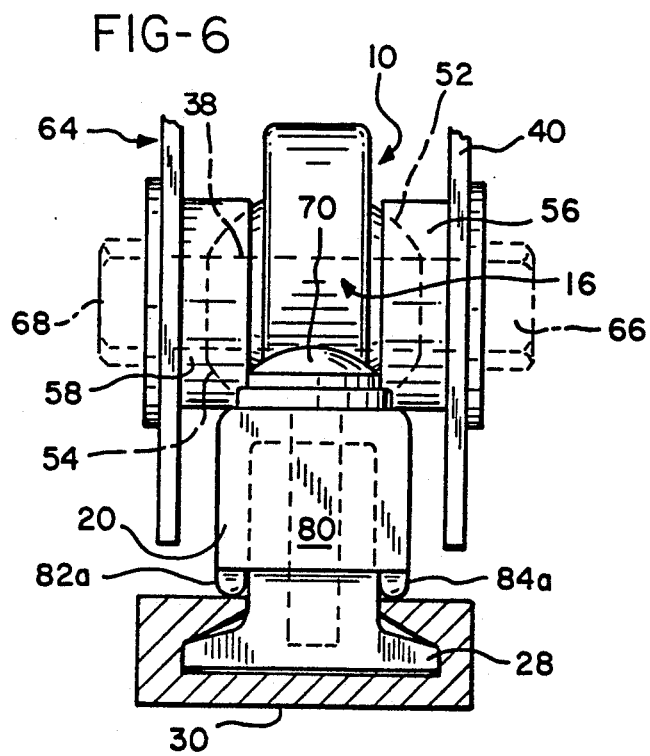
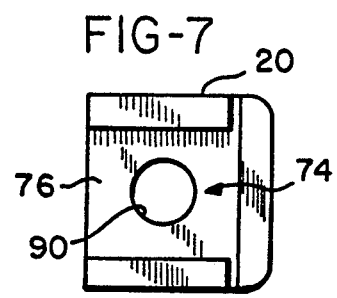

SEAT TRACK BEARING FOR AN AIRPLANE

BACKGROUND OF THE INVENTION

1. Field of the Invention

This invention relates to a bearing member used in a track fitting adapted to be removably secured in a track carrying an airplane seat.

2. Background Discussion

In U.S. Pat. No. 4,771,969 and U.S. Pat. No. 4,796,837 there is disclosed a fitting used to removably secure an airplane seat within a track mounted to the floor of the airplane. Each seat leg has a track fitting secured to it and the fittings are received in tracks that allow the seat to be moved laterally to adjust spacing between rows of seats, or to remove seats if desired.

It is important that the track fitting have a bearing section which is able to withstand very high loads for example in excess of 15,000 pounds. Thus, if the plane was required to stop suddenly, the seats would stay in place and not be ripped from their tracks. Typically, such fittings include anti-rattle devices so that they will not make rattling noises as the airplane vibrates.

It is highly desirable that these track fittings be easy to manufacture and of low cost, but most importantly, that they are able to withstand very high loads. A pin secures the track fitting to the leg, simply by passing through a pair of holes in a clevis type end of the leg through a hole in the bearing portion of the track fitting. The pin is then secured by a threaded fastener attached to a threaded end of the pin, bolting the pin to the bearing section of the track fitting. As discussed in the above patents, it is desirable that the opening allow the pin to pivot somewhat so that there will be a slight give and the pin will not tend to shear under heavy loads.

Although the track fittings described in the above patents function well, they are expensive to manufacture. It is the objective of this invention to provide a track fitting of substantially reduced cost which has all the features of the track fittings disclosed in the above patents.

SUMMARY OF THE INVENTION

The present invention comprises a track fitting which is of substantially lower cost than the track fittings disclosed in the above patents, and includes a unique bearing section which is cast into the fitting to thereby eliminate a separate bearing piece. This provides a substantial savings. The track fitting of this invention is also smaller, employing less material and uses a plastic anti-rattling device which further reduces costs.

There are several features of this invention, one single one of which is solely responsible for its desirable attributes. Without limiting the scope of this invention as expressed by the claims, its more prominent features will now be discussed briefly. After considering this discussion, and particularly after reading the section of this application entitled "DETAILED DESCRIPTION OF THE PREFERRED EMBODIMENT," one will understand how the features of this invention provide its advantages.

The first feature of this invention is that the body of the track fitting includes a unitary bearing member and wall element. This structure eliminates the use of a costly spherical bearing or similar structure such as disclosed in the above patents. The track fitting includes a body member having a base and a wall element which extends outwardly from the base, with an enlarged leg holding section integral with the wall element. The bearing member and wall element are both formed simultaneously during casting the body member, which is made of steel.

The second feature of the invention is that the leg holding section has a uniquely shaped opening in it, which allows the pin for the seat leg to pass through it. This opening is formed by a pair of truncated conical walls within the wall element. Each of these walls has a generally circular base defining respective open ends of the opening and internal conical truncated sections which abut each other at a central portion of the opening to form a circular bearing site within the opening. At each of the open ends there is a segmented spherical bearing surface which surrounds the open ends. Thus the wall element with the bearing members therein may be cast from, for example, steel in a single processing step.

The third feature of this invention is that a pair of end caps are provided at each end of the opening. Each of these end caps has an internal, segmented spherical surface, with each end cap being carried by one of the spherical bearing surfaces at the ends of opening. The internal segmented spherical surfaces of the cap members conform to the bearing surfaces surrounding the open ends. The pin passes through the assembly of end caps mounted on the bearing surfaces, with the pin passing through the openings in the end caps and the opening in the wall element. As will be explained in greater detail below, this provides a bearing structure which can withstand very heavy loads, for example, in excess of 15,000 pounds.

The fourth feature of this invention is that the rear end of the body member has a plastic, anti-rattle device which simply consists of a box like structure having one open side and an open bottom. Thus the box-like structure has two opposed closed side walls and a closed rear wall. The two opposed closed side walls of extend downwardly past the rear wall of to bear against the top of the track with a screw holding the assembly of the anti-rattle device and the track fitting together so that the anti-rattle device acts like a spring applying pressure downwardly against the top of the track.

The preferred embodiment of this invention illustrating all its features will now be discussed in detail in connection with the accompanying drawing.

BRIEF DESCRIPTION OF THE DRAWING

The track fitting of this invention is illustrated in the drawing, which is for illustrative purposes only, and wherein like numerals indicate like parts, and in which:

FIG. 2 is a side elevational view of the track fitting of this invention.

FIG. 3 is a cross-sectional view taken along line 3—3 of FIG. 2.

FIG. 4 is a cross-sectional view taken along line 4—4 of FIG. 2.

FIG. 5 is an enlarged fragmentary view showing the track fitting of this invention with a pin securing the leg seat in position.

FIG. 6 is a rear elevational view of the track fitting of this invention showing the seat leg mounted to it.

FIG. 7 is a bottom plan view of the anti-rattle device used with the track fitting of this invention.

DESCRIPTION OF THE PREFERRED EMBODIMENT

Figure 1:
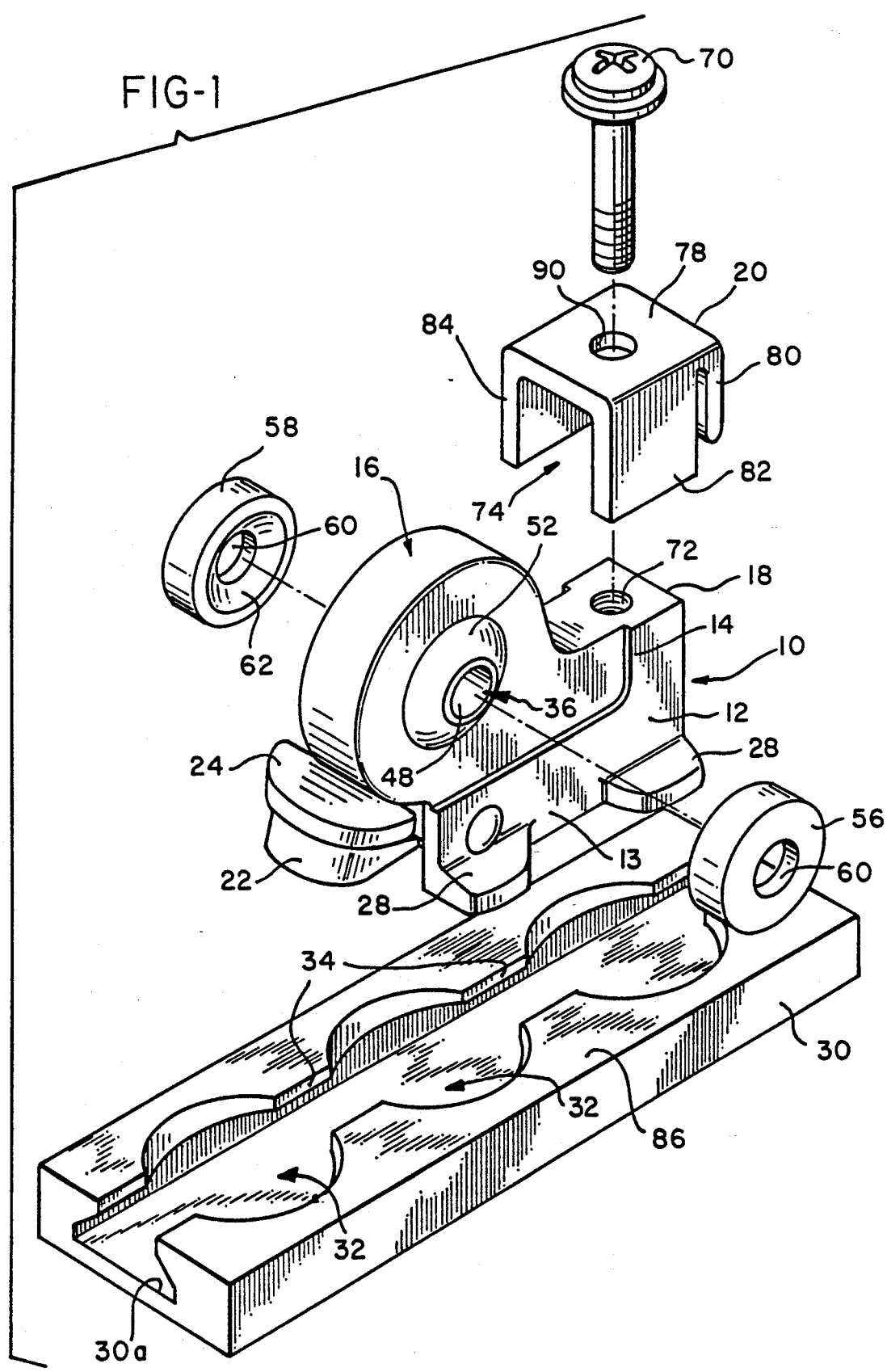
FIG. 1 is an exploded perspective of the track fitting.

As shown in FIG. 1, the track fitting 10 of this invention includes a body member 12 having a base 13 and an upwardly extending wall element 14 including an enlarged leg bearing section 16 and a rear section 18 which carries the anti-rattle device 20. In accordance with conventional practice, this track fitting has a detent member 22 at its forward end which has a head section 24 and finger 26 that is pivotably mounted to the body member. Along the base 13 are pairs of tabs 28 which are received within a track 30. As discussed in greater detail in U.S. Pat. Nos. 4,771,969 and 4,796,837, the tabs 28 are adapted to fit within receptacle sections 32 in the track 30 and slip beneath lip sections 34 within the track. The detent member 22 is initially raised, as shown in FIG. 1, and then with the tabs 28 positioned beneath the lip section 34, the detent member is depressed, as shown in FIG. 2, so that the head section 24 fits into a receptacle section 32 holding the track fitting 10 in place.

In accordance with one of the principal features of this invention, the leg bearing section 16 of the track fitting 10 has an opening 36 extending through it that receives a pin 38 that holds a seat leg 40 in position (FIGS. 4 and 6). The opening 36 is formed by two truncated conical walls 42 and 44 with the circular base of each wall defining the open ends 46 and 48 of the opening 36 that are on opposed sides of the wall element 14. The truncated sections of these walls abut each other in the central portion of the opening 36 to form a bearing site 50 (FIGS. 3 and 5) which has a circular diameter which is substantially less than the circular diameters of the open ends 46 and 48. As will be explained below, this allows space for the pin 38 to pivot about the bearing site 50.

Opposed to each other and surrounding each of the open ends 46 and 48 are segmented spherical bearing surfaces 52 and 54. The bearing surfaces 52 and 54 are generally convex and they are formed during casting of the body member 12. The bearing surfaces 52 and 54 are integral with the wall element 14 and form a unitary structure containing the bearing member. (This is in contrast to the bearing members shown in the above mentioned patents.) Each of the bearing surfaces 52 and 54 carries, respectively cap members 56 and 58.

Each cap member 56 and 58 is a generally cylindrical shaped element having a central opening 60 therein, with each cap member having an internal, concave spherical bearing 62 surface. One cap member 56 rests on one bearing surface 52 with the other cap member 58 resting on the other bearing surface 54. The pin 38 extends through this assembly, as illustrated in FIGS. 3 and 6. The pin 38 passes through one side of a clevis 64 of a seat leg into one central opening 60 of the cap member 56 through the central opening 36 of the leg bearing section 16, into the central opening 60 of the other cap member 58 and then into the other side of the clevis. The head 66 of the pin 38 fits snug against one side of the clevis with the other end of the pin being threaded and having a nut 68 secured to it to hold the pin in position, securing the seat leg to the track fitting 10.

The rear section 18 of the track fitting 10 has the anti-rattle device 20 attached to it by means of a screw 70 which fits into a threaded bore 72 (FIG. 1) in the rear section of the body member 12. The anti-rattle device 20 consists of a box like structure having an open bottom 74 and one open side wall 76. The top wall 78, rear wall 80, and two opposed side 82 and 84 of the box like structure fit snugly over the rear section 18 of the body member 12. The two opposed side walls 82 and 84 are longer than the rear side and their lower edges 82a and 84a (FIG. 6) bear against the top 86 of the track 30 when a threaded fastener 70 passes through a hole 90 in the top wall 78 and is screwed into threaded bore 74.

OPERATION

The way the track fitting 10 of this invention functions is best illustrated in FIGS. 3 and 5. Initially, the fitting 10 is placed in the track 30 by positioning the tabs 28 above the receptacle sections 32 and seating it within a slot 30a in the track 30, with the tabs beneath the lip sections 34. The detent member 22 is initially raised, but when the tabs 28 are beneath the lips 34 it is pushed downwardly so that the head section 24 fits into a receptacle section 32, thereby preventing the fitting 10 from moving laterally within the slot 30a. The seat leg is placed in position with the clevis 64 attached to the upwardly projecting wall element 14 by means of the pin 38. Each of the cap members 56 and 58 are placed on their respective bearing surfaces 52 and 54, and the pin is passed through openings (not shown) in the clevis, the openings 60 in the respective cap members, the opening 36 in the bearing section 16 and then bolted into position. The anti-rattle device 20 is placed on the rear section 18 and then bolted into position so that the ends 82a and 84a of the opposed side walls 82 and 84 will press downwardly against the top 86 of the track 30 acting like a spring to prevent rattling.

As illustrated in FIG. 5, the pin 38 is able to pivot slightly about the bearing site 50, with the cap members 56 and 58 riding over the bearing surfaces 52 and 54 as the pin pivots. Such pivoting occurs if the airplane stops abruptly during landing or takeoff. The clearance provides the space for the pin 38 to tilt any direction about the bearing site 50. During such an abrupt direction about the bearing site 50. During such an abrupt stop, the load on the tracking fitting increase, and may exceed 15,000 pounds. This load is carried on three points: the two points where the cap members 56 and 58 engage the bearing surfaces 52 and 54 an the bearing site 50. Thus, the load is distributed, reducing the likelihood of damage to the track fitting 10.

Because the number of parts, amount of materials, and method of manufacture have been either reduced or simplified, the track fitting 10 of this invention is substantially less costly than the track fittings disclosed in the above mentioned patents.

SCOPE OF THE INVENTION

The above description presents the best mode contemplated of carrying out the present invention. This invention, however, is susceptible to modifications and alternate constructions from the embodiment shown in the drawing and described above. Consequently, it is not the intention to limit it to the particular embodiment disclosed. On the contrary, the intention is to cover all modifications and alternate constructions coming within the spirit and scope of the invention as generally expressed by the following claims.

I claim:
1. A track fitting comprising
   a body member having a base and a wall element extending outwardly from the base, an enlarged leg holding section integral with the wall element and including a bearing member, said wall element and bearing member being a unitary structure with the bearing member comprising an opening in the wall element having opposed open ends that allow a pin for a seat leg to pass through the opening, said opening being formed by a pair of truncated conical walls within the wall element, each conical wall having a generally circular base defining an open end of the opening of the wall element and a truncated section, said truncated sections abutting each other at a central portion of the opening in the wall element to form an internal bearing site within the opening, each of said open ends being surrounded by a segmented spherical bearing surface, a pair of cap members having openings therein and internal segmented spherical surfaces, each cap member being carried by one of the segmented spherical bearing surfaces of the wall element, with the internal segmented spherical surfaces of the cap members conforming to the bearing surfaces surrounding the open ends, and said pin passing through the assembly of cap members and wall element to hold the leg seat securely.

2. The track fitting of claim 1 including an anti-rattle device made of plastic which has a box like structure that fits over the rear end of the body member and includes opposed wall elements that bear against the track fitting and act like a spring.

3. An improved track fitting having a body member including a wall element with a leg holding section carrying a bearing member, wherein the improvement comprises said bearing member and wall element being a unitary structure with the bearing member having an opening therein that provides a central bearing site defined by wall elements that provide clearance for a pin that passes through the opening to allow the pin to pivot in any direction about said bearing site, said opening having opposed open ends, each at least partially encircled by a bearing surface in the form of a segmented, convex sphere, and a pair of cap members, each having openings therein and internal segmented spherical, concave bearing surfaces, with one cap member carried by one of the convex bearing surfaces and the other cap member carried by the other convex bearing surfaces, said bearing surfaces conforming to each other.

* * * * *